United States Patent [19]

Bridges et al.

[11] Patent Number: 5,055,209

[45] Date of Patent: Oct. 8, 1991

[54] REDUCTION OF THE VISCOSITY OF SOLUTIONS VISCOSIFIED WITH XANTHAN GUM POLYMERS

[75] Inventors: Kenneth L. Bridges, Breaux Bridge; Kerry L. Kalinski, Lafayette, both of La.

[73] Assignee: Osca, Inc., Lafayette, La.

[21] Appl. No.: 345,494

[22] Filed: May 1, 1989

[51] Int. Cl.$^5$ .............................................. E21B 43/16
[52] U.S. Cl. ................................ 252/8.51; 252/8.513; 252/8.514; 252/8.551
[58] Field of Search ................. 252/8.51, 8.551, 8.513, 252/8.514

[56] References Cited

U.S. PATENT DOCUMENTS

| | | | |
|---|---|---|---|
| 2,483,936 | 10/1949 | Roberts | 252/8.51 |
| 2,717,875 | 9/1955 | Weiss | 252/8.51 |
| 2,816,071 | 12/1957 | Watkins | 252/8.51 |
| 3,740,360 | 6/1973 | Nimerick | 252/8.512 X |
| 3,757,861 | 9/1973 | Routson | 166/273 |
| 3,779,914 | 12/1973 | Nimerick | 252/8.551 |
| 3,882,029 | 5/1975 | Fischer | 252/8.551 |
| 4,144,179 | 3/1979 | Chatterji | 252/8.551 |
| 4,377,637 | 3/1983 | Weisrock | 435/104 |
| 4,464,268 | 8/1984 | Schievelbein | 252/8.552 |
| 4,517,101 | 5/1985 | Williams et al. | 252/8.554 |
| 4,552,674 | 12/1985 | Brown et al. | 252/8.551 |
| 4,565,640 | 1/1986 | Parks | 252/8.551 |
| 4,594,170 | 6/1986 | Brown et al. | 252/8.551 |
| 4,610,795 | 9/1986 | Norris et al. | 252/8.551 |

Primary Examiner—Robert L. Stoll
Assistant Examiner—Chhaya Sayala
Attorney, Agent, or Firm—Woodard, Emhardt, Naughton Moriarty & McNett

[57] ABSTRACT

The viscosity of Xanthan gum polymer solutions is reduced by the addition of hydrogen peroxide and adjustment of the pH of the solution to at least 8.0.

18 Claims, 3 Drawing Sheets

REDUCTION OF THE VISCOSITY OF SOLUTIONS VISCOSIFIED WITH XANTHAN GUM POLYMERS

FIELD OF INVENTION

This invention relates to the usage of hydrogen peroxide to reduce the viscosity of viscous solutions containing a Xanthan gum polymer at a predetermined rate and low temperatures by adjusting the pH of the solution to at least 8.0. Preferably a caustic agent is used to increase the pH of the solution and therefore, to reduce the viscosity of Xanthan gum polymer solutions used in oil field recovery operations, especially those employing gravel packs.

DESCRIPTION OF THE ART

In some industrial applications, the control of the fluid viscosity during a process is of paramount importance. At times during such processes, it is highly desirable to have a very viscous fluid, whereas at other times no viscosity is desired. In such applications, additives called "breakers" are used to reduce the viscosity of the fluid or "break" the fluid.

One important application of varying the viscosity of a fluid can be found in oil field recovery operations. In these operations, breakers are added to reduce the viscosity of special fluids. These special fluids, called drilling and completion fluids (hereinafter collectively "drilling fluids"), are essential to oil recovery operations. These fluids are usually thickened with a polymeric thickening agent, (e.q., Guar gum, hydroxyethyl cellulose, or Xanthan gum). At times, it is desirable to have a very viscous drilling fluid because the increased viscosity enhances the ability of the drilling fluid to carry particulate matter from the wellbore. However, at other times it is desirable to increase the flow of the drilling fluid and therefore decrease the viscosity of the fluid. This change in viscosity has been accomplished by in the past by various enzymes, acids and oxidizing agents used as breakers. However, prior art breakers have not been successfully used in reducing the viscosity of Xanthan gum polymers, especially in gravel pack applications for oil wells. The prior art breakers act upon the polymer to degrade its intermolecular bonding. Upon such reaction with the polymer, the prior art breakers form harmful residual solids. These residual solids may lead either to poor compaction or to formation damage to the strata, therefore reducing oil production.

U.S. Pat. No. 2,483,936 discloses a drilling fluid comprising a water soluble oxidized mannogalactan collodial suspending agent. The oxidizing mannogalactan is prepared by contacting mannogalactan dissolved in water with sodium peroxide and hydrogen peroxide in an alkaline solution in order to reduce the viscosity of the mannogalactan. Mud is added to the mannogalactan to form a drilling fluid which displaces oil from the wellbore. The patent is not concerned with decreasing the viscosity of a fluid. Rather, it deals with drilling fluids which will resist contamination by salt and which will decrease water loss from the drilling fluid.

U.S. Pat. No. 3,882,029 describes a non-damaging well completion and workover fluid, comprising a dispersion of oil-soluble, water insoluble particles in an aqueous salt solution. The aqueous salt solution contains chrome lignite, hydroxyethyl cellulose, Xanthan gum and a water soluble inorganic alkali metal or ammonium salt. However, this patent is not concerned with the reduction of the viscosity of a polymer solution containing Xanthan gum.

U.S. Pat. No. 4,377,637 discloses a method for producing a reduced viscosity Xanthan gum. The method comprises culturing a microorganism of the genus Xanthomonas in a nutrient medium containing a sulfate anion. However, the reference does not deal with the reduction of the viscosity of the Xanthan gum polymer solutions which are used in gravel pack applications.

U.S. Pat. No. 4,565,640 describes controlling the viscosity of an aqueous solution containing a polymeric thickener. The preferred polymeric thickener is Xanthan gum. The viscosity of such a solution is controlled by the addition of an alkali metal hypochlorite and cyanuric acid. This type of breaker produces residual solids which may damage the oil bearing strata and therefore reduce production of the oil from the well.

Accordingly, a primary object of the present invention is to reduce the viscosity of a Xanthan gum polymer solutions during an oil recovery process without the production of harmful residual solids which may cause damage to the strata and reduce the oil production.

Another object is to reduce the viscosity of Xanthan gum polymer solutions by adjusting the pH of the solution.

Another object is to reduce the viscosity of Xanthan gum polymer solutions with hydrogen peroxide in the presence of a caustic agent.

Yet another object of the invention is to reduce the viscosity of Xanthan gum polymer solutions at a predetermined rate and low temperature.

SUMMARY OF THE INVENTION

The foregoing and other objects, advantages and features of the present invention may be achieved with the method for reducing the viscosity of viscous solutions containing Xanthan gum polymers by adding to the Xanthan gum polymer solution an effective amount of hydrogen peroxide and adjusting the pH of the solution to a minimum of 8.0. The pH may be adjusted by the addition of a caustic agent. The method comprises the steps of contacting the Xanthan gum polymer solution with an effective amount of hydrogen peroxide at between 100° F. to 200° F. and adjusting the pH of the solution is raised to about 8 to 10 in order to enhance the degradation of the polymer.

DETAILED DESCRIPTION OF THE INVENTION

Figure 1:
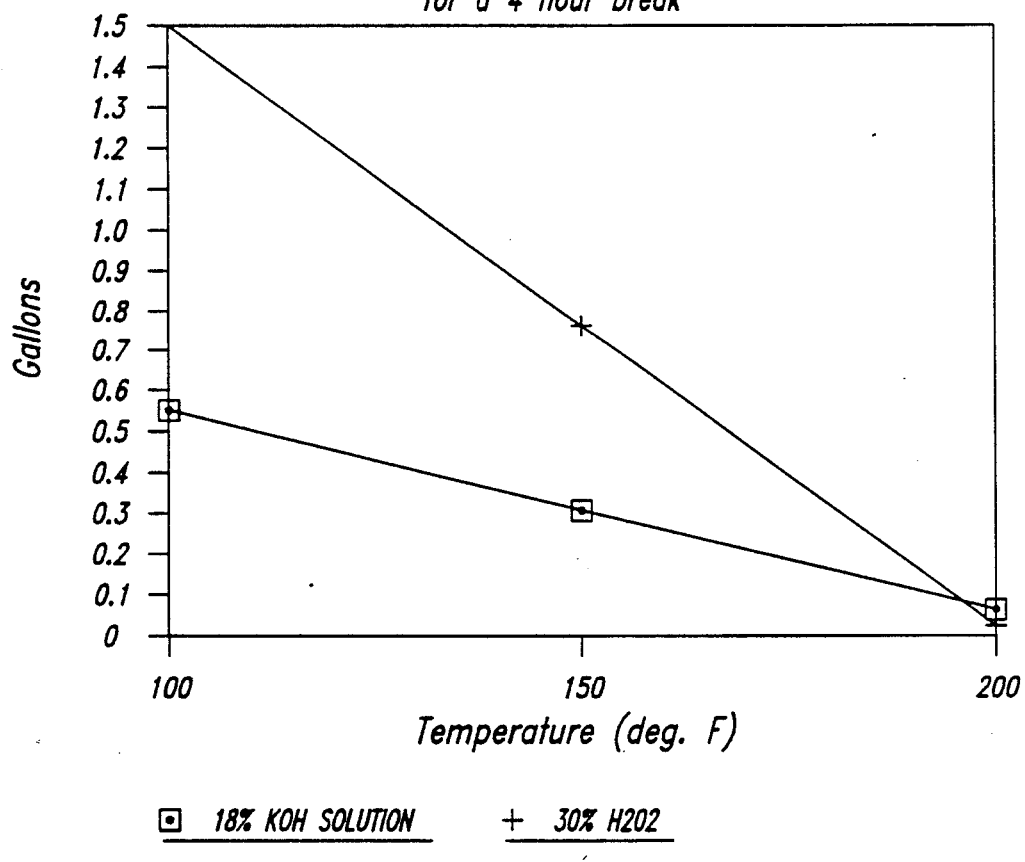
FIG. 1 shows in graph form the relationship determined in the Examples between Loading Levels and Temperature for a 4 hour break in viscosity.

The reduction of the viscosity of Xanthan gum polymer solutions by breakers has heretofore not been very successful due to the formation of harmful residual insoluble solids. Known viscosity reducing agents or "breakers" such as enzymes, acids and oxidizing agents produce free anions and cations when the breaker reacts with the polymer. Known breakers include ammonium persulfate acid, LiOCl, and NaOCl. These free anions and cations may react with well formations, damaging the oil producing strata. Once the oil producing strata are damaged, oil production from the well is reduced.

This invention relates to a process for reducing the viscosity of Xanthan gum polymer solutions in a manner that avoids such damage. Xanthan gum polymer solutions are frequently used in oil well applications. It has been found that the Xanthan gum polymer solutions can be degraded to water and various forms of simple polysaccharides which are not damaging to well formations. In the preferred form, the process consists of adding hydrogen peroxide in the presence of a caustic agent to a viscous Xanthan gum polymer solution.

In one aspect of the present invention, the process involves the addition of hydrogen peroxide to a drilling fluid which is present in a wellbore. The drilling fluid includes Xanthan gum polymer solution as a thickening agent. When it is desired to reduce the viscosity of the drilling fluid hydrogen peroxide is added thereto, preferably in the presence of a caustic agent such as potassium hydroxide or sodium hydroxide. The drilling fluid temperature is at least 100° F., and typically in a wellbore ranges from 150° F. to 400° F.

The Xanthan gum polymer solution comprises of Xanthan gum; water; iron sequestrant which may be any of EDTA, NTA, or citric acid; surfactants, and ammonium chloride. Xanthan gum is a high molecular weight linear polysaccharide that is readily soluble in water to form highly viscous fluids. The primary structure of the polysaccharide consists of a cellulose backbone with trisaccharide side chains, the repeating unit being a pentasaccharide. Xanthan gum may be produced by fermentation of the bacterium Xanthomonas campestis. The preferred Xanthan gum polymer solution is prepared using 1.8 pounds per barrel (ppb) of drilling fluid of Xanthan gum, commercially available from The Merck Co. under the trademark Xanvis ® in a 3 percent solution of ammonium chloride at a pH of 7.5. The polymer solution is then sheared with a homogenizer, and vacuum filtered through a 2 micron cartridge filter.

Hydrogen peroxide is then added to the Xanthan gum polymer solution. Preferably about 0.01 to 8.5 barrels of solution (30%) of hydrogen peroxide are used per barrel of drilling fluid. In the most preferred form, at least a 30 percent solution of hydrogen peroxide is used.

The pH of the solution is then increased. The pH of the solution may be increased by the addition of a caustic agent. Possible caustic agents include potassium hydroxide, sodium hydroxide and ammonium hydroxide or any other soluble basic material that gives a solution pH at least 8.0.

The preferred caustic agents used in accordance with this invention include potassium hydroxide and sodium hydroxide. If sodium hydroxide is used, preferably about 0 to about 1.5 pounds per barrel are added to the hydrogen peroxide solution prior to its being introduced to the Xanthan gum polymer solution. If potassium hydroxide is the caustic agent, about 0 to about 1.5 pounds per barrel are added to the hydrogen peroxide. The addition of hydrogen peroxide in the presence of a caustic agent increases the pH of the polymer solution. A pH increase enhances the effectiveness of the breaker. Preferably the pH of the solution should be in the range of about 8 to about 10.

The solution is heated to approximately at least 100° F., otherwise more breaker is required. A temperature of 100° F. is considered low with respect to normal well bore temperature which range from 150° F. to 400° F. Heating may occur artificially (i.e., the solution is placed in an oven) or naturally (i.e. after injection of the fluid into a wellbore as it travels down the bore). At higher temperatures, less of the breaker is necessary to degrade the polymer. The rate of decomposition of the polymer system is a function of temperature and breaker concentration. Therefore by establishing these parameters, the rate of decomposition may be predetermined.

The Xanthan gum polymer solution is broken down into water, sugars and $CO_2$ when the hydrogen peroxide in the presence of the caustic agent reacts with the polymer in solution. Therefore, no harmful residual solids are formed which can lead to poor compaction or formation damage. The intermolecular and intramolecular bonding of the Xanthan gum polymer in the polymer solution is degraded and the viscosity of the solution is thus reduced. No harmful residual solids are produced by degradation of the Xanthan gum polymer solution in the foregoing manner. Evidence of harmful residual by-products should be observed as insoluable precipitates. No such precipitates are present in the broken solution.

EXAMPLE 1

In the laboratory, a gravel suspending fluid made with Xanthan gum was prepared using 1.8 ppb Xanvis ® in a 3% solution of ammonium chloride at a pH of 7.5. Iron sequesterers such as citric acid, EDTA, and NTA as well as surfactants may also be added. The polymer solution was sheared with an homogenizer and then vacuum filtered through a 2 micron cartridge filter. A specified amount necessary to achieve a complete break after 4 hours was added to the polymer solution at room temperature. The rheology of the solution was the measured as a function of time using a standard rotational rheometer.

At 100° F., hydrogen peroxide alone was added to the polymer solution Xanthan gum in the form of the preferred Xanvis ® solution as a breaker pH to between 8 and 10. One barrel required 8.4 gallons of a 30% hydrogen peroxide solution to produce the following results:

| Time (hours) | Average Viscosity | Plastic Viscosity | Yield Point | Viscosity at 100 RPM (cps) |
| --- | --- | --- | --- | --- |
| 0 | 16 | 7 | 18 | 54 |
| 4 | 5 | 4 | 1 | 9 |
| 8 | 2 | 1 | 0 | 0 |

EXAMPLE 2

The procedure outlined in Example 1 was followed using 0.55 gallons of the 18% solution of potassium hydroxide and 1.5 gallons of the 30% solution of hydrogen peroxide per barrel of polymer solution. The solution was subsequently heated up to 100° F. Time versus rheology results are as follows:

| Time (hours) | Average Viscosity | Plastic Viscosity | Yield Point | Viscosity at 100 RPM (cps) |
| --- | --- | --- | --- | --- |
| 0 | 16 | 7 | 18 | 54 |

-continued

| Time (hours) | Average Viscosity | Plastic Viscosity | Yield Point | Viscosity at 100 RPM (cps) |
| --- | --- | --- | --- | --- |
| 4 | 11 | 7 | 8 | 12 |
| 8 | 2 | 2 | 0 | 0 |

The results of this experiment when compared to the results of Example 2 demonstrate that the use of a caustic agent reduces the amount of hydrogen peroxide needed to achieve a complete break in the viscosity of the solution.

As discussed previously, the viscosity of the solution must be reduced without the formation of residual solids which can subsequently cause formation damage. In order to determine if residual solids were formed due to the degradation of the Xanthan gum polymer, the return permeability of the viscosified polymer both before and after treatment with the breaker (hydrogen peroxide in the presence of a caustic agent) at 100° F. was studied. Four hundred MD cores (air permeability) were used for these tests. The cores were dried in an air oven at 400° F. and then saturated by 4% ammonium chloride solution in a vacuum desiccator. The initial permeability was determined by injecting a 4% ammonium chloride solution at a constant rate for more than twelve hours until stabilized permeability was obtained. The polymer solution (same as in Example 1) was injected at a constant pressure until the core was completely saturated with the solution. The polymer solution was allowed to remain in the core at 150° F. for 24 hours. Probable polymer-matrix interaction, as well as plugging of minute pores of the core by polymer molecules would occur during this period. After this time period, the 4% ammonium chloride solution was reinjected at a constant rate until stabilized permeability was again obtained.

The results showed 90% of the initial permeability was obtained in the polymer solution after the injection of 18 pore volumes of reference brine. After the viscosity of the polymer was reduced, 100% of the initial permeability was obtained after the injection of only 1 pore volume of reference brine. This result indicates that no formation damage should occur due to residual solids presence.

EXAMPLE 3

Using the procedure of Example 1, the polymer solution was heated to 150° F. after the addition of 0.275 gallons of the 18% solution of potassium hydroxide and 0.75 gallons of the 30% solution hydrogen peroxide per barrel of viscosified polymer solution to achieve a pH value between 8-10. Rheology measurements yielded the following information:

| Time (hours) | Average Viscosity | Plastic Viscosity | Yield Point | Viscosity at 100 RPM (cps) |
| --- | --- | --- | --- | --- |
| 0 | 16 | 7 | 18 | 54 |
| 2 | 6 | 5 | 3 | 9 |
| 4 | 2 | 1 | 1 | 0 |

EXAMPLE 4

Example 4 illustrates that much less of the breaker was required per barrel of polymer solution at 200° F. In this example, 0.055 gallons of the potassium hydroxide and 0.01 gallons of the hydrogen peroxide were used per barrel of Xanthan gum polymer solution to achieve a pH value between 8-10. The experiment yielded the following results:

| Time (hours) | Average Viscosity | Plastic Viscosity | Yield Point | Viscosity at 100 RPM (cps) |
| --- | --- | --- | --- | --- |
| 0 | 16 | 7 | 18 | 54 |
| 2 | 6 | 5 | 3 | 9 |
| 4 | 2 | 1 | 1 | 0 |

EXAMPLE 5

In order to determine the effect of pH upon the effectiveness of hydrogen peroxide as a breaker, the pH of the Xanthan gum polymer solution was lowered to 2 by the addition of hydrochloric acid. 1.5 gallons of hydrogen peroxide were added to the Xanthan gum polymer solution. The solution was heated to 100° F. Time versus rheology results are as follows:

| Time (hours) | Average Viscosity | Plastic Viscosity | Yield Point | Viscosity at 100 RPM (cps) |
| --- | --- | --- | --- | --- |
| 0 | 16 | 7 | 18 | 54 |
| 4 | 16 | 7 | 18 | 54 |
| 8 | 15 | 5 | 20 | 50 |

Figure 2:
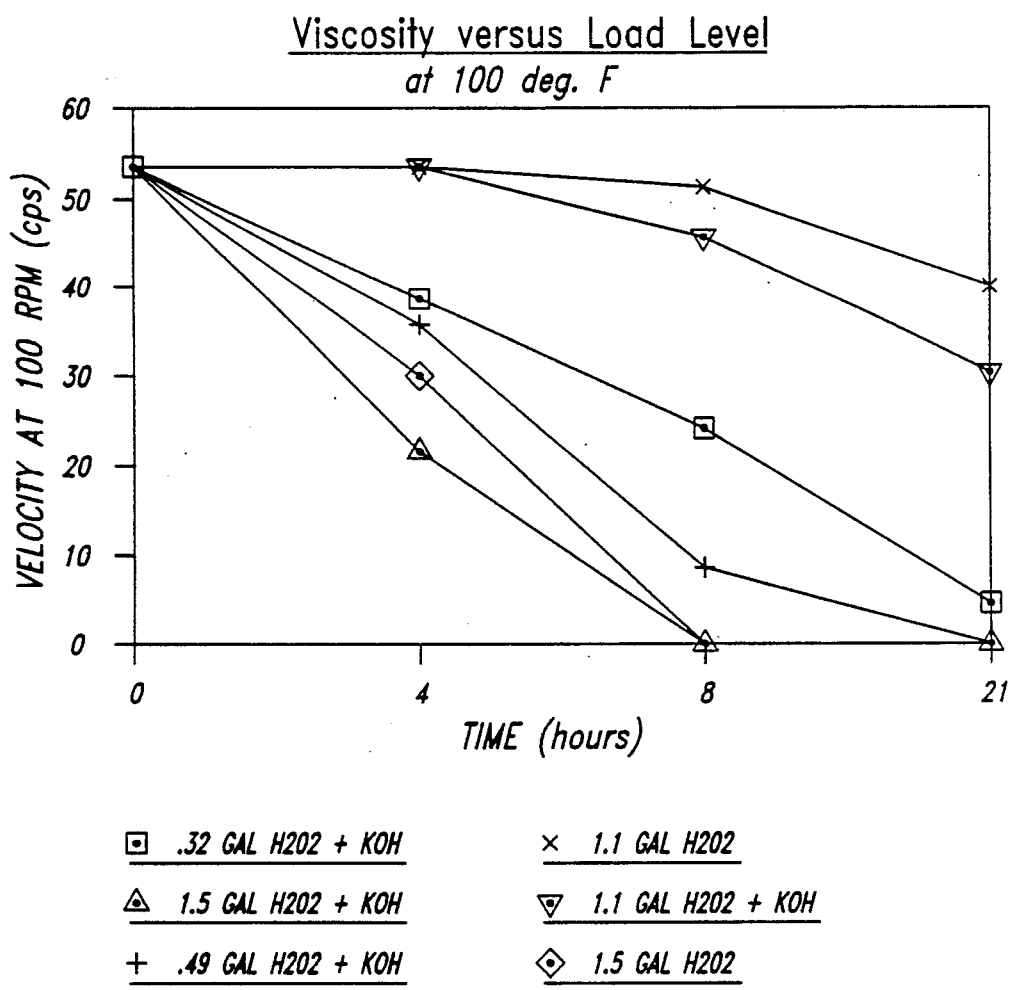
FIG. 2 shows in graph form the relationship determined in the Examples between Viscosity and Load Level at 100° F.
Figure 3:
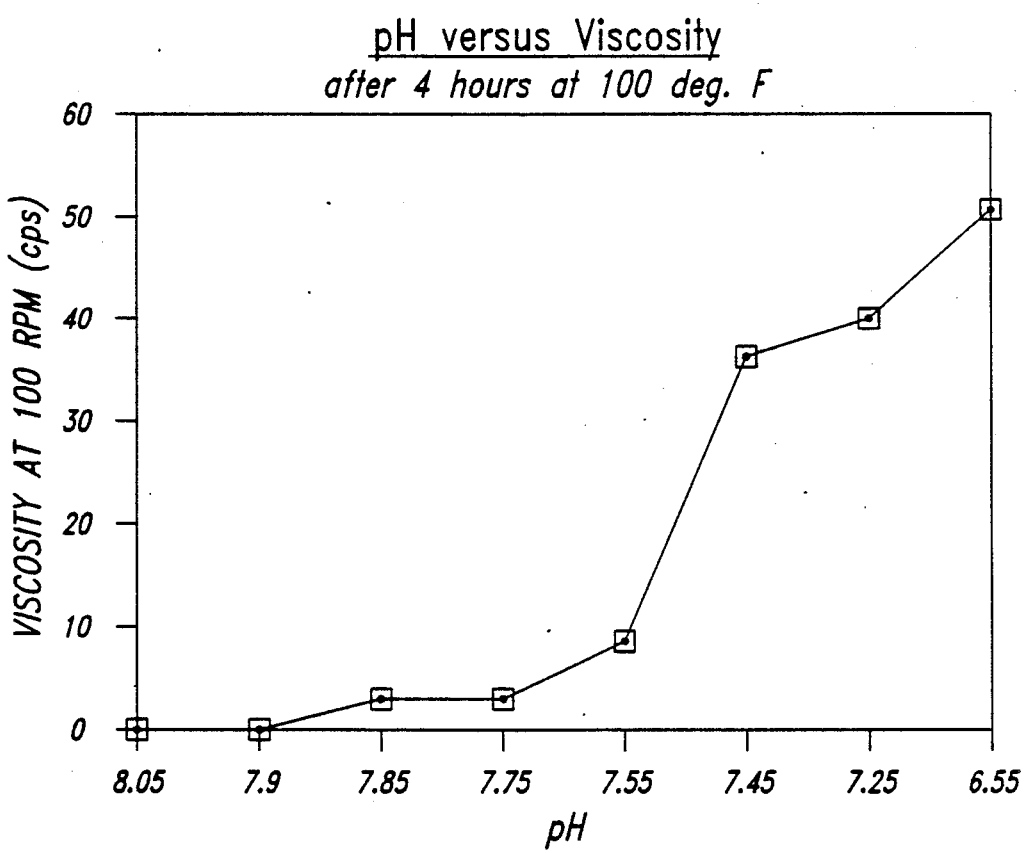
FIG. 3 shows in graph form the relationship determined in the Examples between pH and Viscosity after 4 hours at 100° F.

These results demonstrate that the viscosity of polymer solution did not decrease upon the addition of hydrogen peroxide alone at an acidic pH. An increase in the pH is necessary to utilize the hydrogen peroxide effectively as a breaker or viscosity reducer to achieve a pH value between 8.0 to 10.0. The results reported in Examples 1 through 5 with respect to the effect of termperature and pH are summarized in FIGS. 1, 2 and 3.

We claim:

1. A process for reducing the viscosity of a drilling fluid containing Xanthan gum polymer solution comprising contacting the drilling fluid with hydrogen peroxide and adjusting the pH of the solution to a level of at least about between 8 and 10.

2. A process, as claimed in claim 1 wherein the pH is adjusted by the addition of a caustic agent to the drilling fluid.

3. A process, as claimed in claim 2, wherein the caustic agent is selected from the group consisting of sodium hydroxide or potassium hydroxide.

4. A process, as claimed in claim 2, wherein the caustic agent is potassium hydroxide.

5. A process, as claimed in claim 2, wherein the caustic agent is sodium hydroxide.

6. A process, as claimed in claim 1, wherein about 0.01 gallons to 8.5 gallons per barrel of 30% hydrogen peroxide is utilized.

7. A process, as claimed in claim 3, wherein about 0 to 1.5 pounds potassium hydroxide is utilized.

8. A process, as claimed in claim 1 wherein the pH of the drilling fluid is adjusted to the range of about 8 to about 10 upon addition of hydrogen peroxide.

9. A process for reducing the viscosity of a drilling fluid in a wellbore, the drilling fluid containing Xanthan gum polymer said process comprising injecting hydrogen peroxide into the drilling fluid and adjusting the pH of the drilling fluid in the wellbore to at least about 8-10.

10. A process, as claimed in claim 9, wherein the pH of the drilling fluid is adjusted by the addition of a caustic agent.

11. A process, as claimed in claim 9, wherein the caustic agent is chosen from the group comprising sodium hydroxide or potassium hydroxide.

12. A process, as claimed in claim 9, wherein the caustic agent is sodium hydroxide.

13. A process, as claimed in claim 9, wherein the caustic agent is potassium hydroxide.

14. A process, as claimed in claim 9, wherein the pH of the solution is adjusted to the range of about 8 to about 10 upon addition of hydrogen peroxide into the wellbore.

15. In a method of completion or workover of wells wherein a high density viscous fluid is injected into the well to exert sufficient pressure to control the well hydrostatic pressure, the viscous fluid including Xanthan gum polymer as a thickening agent, the improvement comprising:

adding hydrogen peroxide to the viscous fluid and adjusting the pH of the fluid to at least 8–10 to decrease the viscosity of the viscous fluid.

16. The improvement of claim 15 in which said adjusting of the pH comprises adding a caustic agent to the viscous fluid.

17. The improvement of claim 16 in which said adjusting of the pH comprises adding sodium hydroxide.

18. The improvement of claim 16 in which said adjusting of the pH comprises adding potassium hydroxide.

* * * * *